No. 622,195.    Patented Apr. 4, 1899.
W. D. ALLISON.
CABINET.
(Application filed Jan. 7, 1898.)
(No Model.)
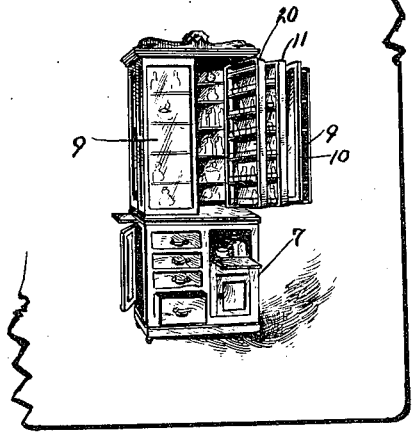
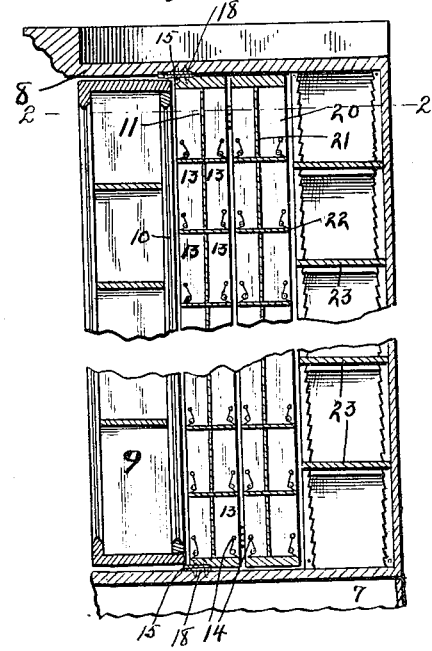
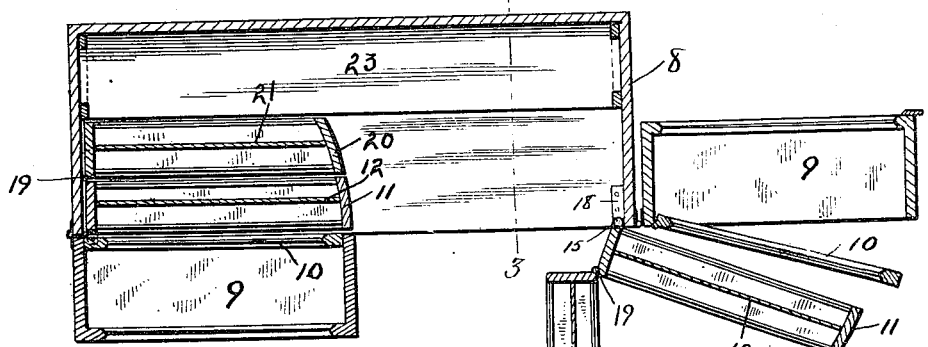
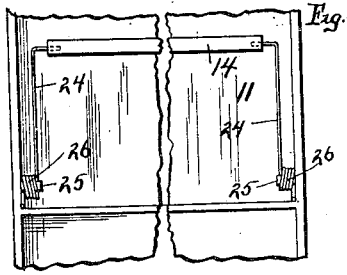
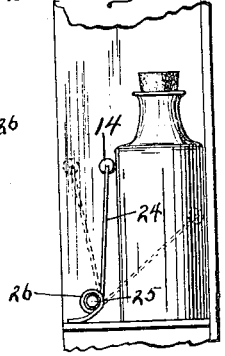
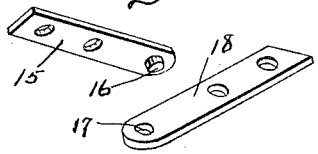
WITNESSES:
INVENTOR
William D. Allison
BY
Arthur M. Hood.
ATTORNEY.

UNITED STATES PATENT OFFICE.

WILLIAM D. ALLISON, OF INDIANAPOLIS, INDIANA.

CABINET.

SPECIFICATION forming part of Letters Patent No. 622,195, dated April 4, 1899.

Application filed January 7, 1898. Serial No. 665,940. (No model.)

*To all whom it may concern:*

Be it known that I, WILLIAM D. ALLISON, a citizen of the United States, residing at Indianapolis, in the county of Marion and State of Indiana, have invented a new and useful Cabinet, of which the following is a specification.

My invention relates to an improvement in cabinets for holding medicines, surgical instruments, &c.

The object of my invention is to produce a cabinet in which within a limited space a large shelf area may be provided, the arrangement being such that the shelf area may be greatly subdivided and all of the parts easily reached.

A further object is to provide an improved form of bottle-rack.

The accompanying drawings illustate my invention.

Figure 1 is a perspective view of my improved cabinet. Fig. 2 is a horizontal section on line 2 2 of Fig. 3. Fig. 3 is a vertical section on line 3 3 of Fig. 2. Fig. 4 is a detail of one of the pivots for the bottle-rack. Fig. 5 is a detail elevation of one of the bottle-holders. Fig. 6 is an end elevation thereof.

In the drawings, 7 indicates a stand provided with suitable drawers and cupboards of any desired size and arrangement. Mounted upon stand 7 is an open-faced casing 8. Hinged to the open face of casing 8 upon the outer edges thereof are a pair of cupboards or casings 9 9, each of which is provided with suitable shelves and a door 10, adapted to close the inner face thereof. The arrangement of cupboards 9 9 is such that when they are in their closed position, as shown at the left of Fig. 2, they will close the open face of the casing 8. Pivoted in casing 8, one upon each side thereof, is a bottle-rack 11, which is preferably provided with a central vertical partition 12, and is also provided with a series of shelves forming a series of bottle-compartments 13, each of which is preferably provided with an automatically-adjustable guard 14, adapted to retain the bottles in position. In order that racks 11 may be swung entirely out of the casing 8, I secure to the upper and lower ends, at the outer corners of said racks, a plate 15, provided on one face near the outer end thereof with a pin 16, which is adapted to fit into a socket 17, carried by a plate 18, secured to the upper and lower walls of the casing 8, the arrangement being preferably such that the pivot-point of the rack will lie in line with or slightly outside of the open face of casing 8. In order to increase the capacity of the bottle-rack, I hinge to the outer edge of the inner face of each rack 11, as shown at 19, a similar rack 20, which is provided with a partition 21, shelves 22, and guards 14. The depth of the two racks 11 and 20 is somewhat less than the depth of the casing 8, and in the remaining space at the rear of the bottle-racks I provide a series of adjustable shelves 23, upon which may be placed large bottles, &c.

In order to arrange the bottle-racks so that bottles of various sizes may be securely held thereon by means which shall be the same for all of the racks, I pivot to each end of each guard 14 an arm 24, (the guard thus forming a roller,) and this arm is pivoted upon a pin 25, secured at each end of each bottle-compartment. A suitable spring 26 is provided to force the guard 14 inward toward the rear of the compartment. Arm 24 and spring 26 are preferably formed of a single piece of spring-wire, as shown in Figs. 5 and 6, and, if desired, the guard 14 may be formed of a piece of wire the two ends of which are bent to form the arms and springs. When the cabinet is closed, the various parts occupy the relative positions shown at the left of Fig. 2. In order to reach the inside of cupboards 9, the said cupboards are swung upon their hinges into the position shown at the right of Fig. 2. With either cupboard in this position the bottles in front of the adjacent rack 11 may be easily reached. To reach the bottles in the rear of rack 20, rack 11, carrying with it rack 20, is swung upon its pivot 16 17 into the position occupied by rack 11 at the right of Fig. 2. In order to reach the bottles in the adjacent faces of racks 11 and 20, rack 20 is swung upon its hinges, thus separating the adjacent faces of the two racks. With racks 11 and 20 swung outward shelves 23 may be easily reached.

By the above-described construction a cabinet is formed in which every portion of the shelf area is made available, the said area being easily subdivided and each subdivision easily reached, the whole occupying but a limited space. With the described construction of guard for the bottle-racks each shelf is adapted to hold bottles of various sizes.

I claim as my invention—

1. In a cabinet, the combination with the open-faced main casing, of a bottle rack or casing pivoted in the open face of the main casing and adapted to be swung outward therefrom, and a second bottle rack or casing, the said second casing being hinged to the inner face of the first casing at the pivoted end thereof, substantially as described.

2. In a cabinet, the combination with the open-faced main casing, of a bottle rack or casing pivoted in the open face of the main casing and adapted to be swung outward therefrom, a second bottle rack or casing, the said second casing being hinged to the inner face of the first casing at the pivoted end thereof, and a cupboard hinged to the open face of the main casing and adapted to form a cover therefor, substantially as described.

WILLIAM D. ALLISON.

Witnesses:
ARTHUR M. HOOD,
FRANK A. FAHLE.